United States Patent [19]

Nakajima

[11] Patent Number: 4,765,375
[45] Date of Patent: Aug. 23, 1988

[54] DUCT

[76] Inventor: Kenji Nakajima, 3-5, Nagayoshidedo 6-chome, Hirano-ku, Osaka, Japan

[21] Appl. No.: 8,953

[22] Filed: Jan. 30, 1987

[30] Foreign Application Priority Data

Jan. 30, 1986 [JP] Japan .............................. 61-12738[U]

[51] Int. Cl.[4] .............................................. F16L 9/00
[52] U.S. Cl. .................................... 138/155; 138/109; 285/363; 285/368; 285/424
[58] Field of Search ....... 138/120, 155, 109, DIG. 10, 138/DIG. 4; 285/405, 406, 412, 332, 332.2, 332.4, 334.5, 335, 363, 364, 368, 424

[56] References Cited

U.S. PATENT DOCUMENTS 3,805,845 4/1974 Santoro .............................. 138/155

Primary Examiner—James E. Bryant, III
Attorney, Agent, or Firm—Wenderoth, Lind & Ponack

[57] ABSTRACT

An improved duct is proposed which comprises a plurality of duct sections coupled together. Each duct section has a turned-up portion and a flange at one end and a flange at the other end. Both the turned-up portion and the flanges are formed by bending the edge of each duct section. The turned-up portion of one tubular body is inserted into the not-turned-up end of an adjacent tubular body. Bolt holes provided in each section are adapted to align with each other by themselves. Also, the inner edge the packing disposed between the flanges is covered up by the turned-up portion.

5 Claims, 2 Drawing Sheets

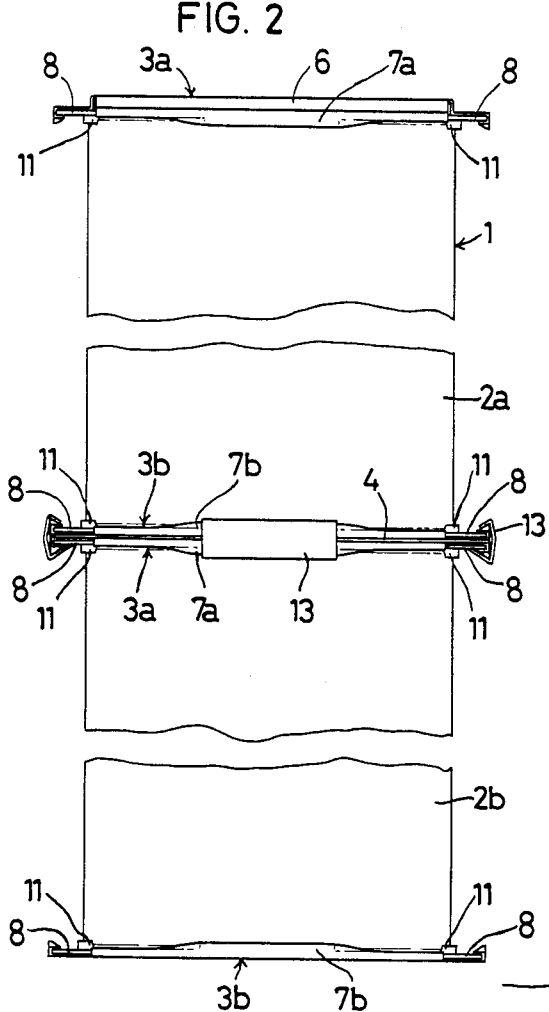
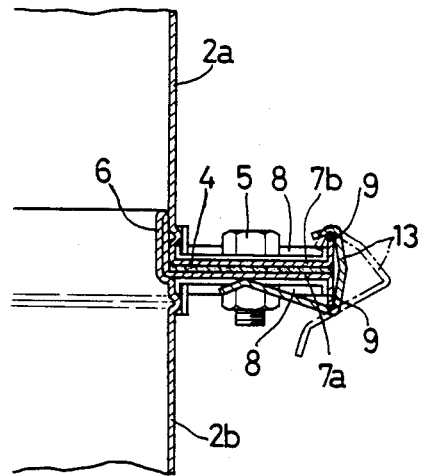

DUCT

FIELD OF THE INVENTION

The present invention relates to a duct for use in an air conditioning system or the like.

PRIOR ART

A duct having a square section is usually formed by connecting a plurality of tubular bodies of duct sections to each other. For this purpose, each tubular body is flanged at both ends so that the flanges of the adjacent tubular bodies can be put together and fastened with bolts with a packing insertd between the flanges to make the flange joint airtight.

A drawback of conventional ductwork is that bolt holes in a flange have to be exactly alinged with those in another flange facing it. Such alignment requires a great deal of labor, and the work of fastening the flanges with bolts is troublesome because each flange joint has to be fastened with a lot of bolts.

Another drawback is that the packing disposed between the flanges to make the flange joint airtight is made of asbestos or glass fiber. When such a duct is used in an air conditioning system, fine particles of asbestos or glass fiber are apt to be drawn into the duct by suction and discharged into a room. Consequently, asbestosis or the like will be caused by the inhalation of these fine particles.

SUMMARY

It is an object of the present invention to provide a duct in which the alignment of the bolt holes is easy.

It is another object of the present invention to provide such a duct that even if the packing inserted between the flanges is made of asbestos or glass fiber, fine particles thereof are prevented from being drawn through the duct.

One end of each body is turned up to form a turned-up portion. For connecting a plurality of tubular bodies to each other, the turned-up portions are directed in the same direction so that a joint will be formed by the insertion of the turned-up end of one body into the other end of the adjacent body. Thus the two flanges, of which each flange joint consists, are free from transverse displacement and face each other in such a manner that bolt holes in one flange are automatically aligned with those in the other.

The inside edge of the packing inserted between the flanges is covered up by the turned-up end of one body inserted into the other end of the next body.

With the above-described objects in view, and as will become apparent from the following detailed description, the present invention will be more clearly understood in connection with the accompanying drawings, in which:

BRIEF DESCRIPTION OF THE DRAWINGS

FIG. 2 is a partially cutaway side view thereof, illustrating the parts assembled; and FIG. 3 is an enlarged vertical sectional side view of a portion thereof.

DESCRIPTION OF THE PREFERRED EMBODIMENTS

Figure 1:
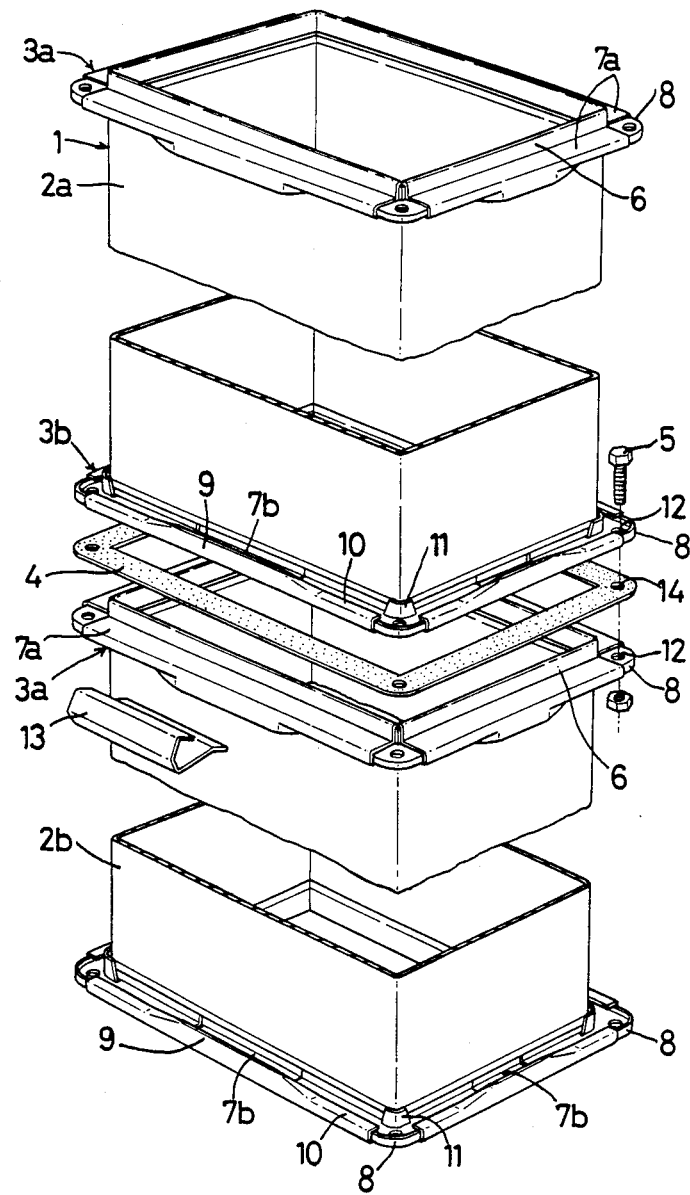
FIG. 1 is a partially cutaway exploded perspective view of an embodiment of the present invention.

Referring now to FIGS. 1 and 2, numeral 1 designates a duct comprising tubular bodies or duct sections 2a to 2b to be connected. Each body has a square section. Each body is provided with a flange 3a at one end and a flange 3b at the other end. To make the flange joint airtight, a packing 4 is inserted between the flange 3b of the body 2a and the flange 3a of the body 2b. Then the two flanges are fastened with bolts 5.

Referring now to FIG. 3, the side wall of each tubular body is folded outwardly at one end so as to form a turned-up portion 6, and is further bent at right angles with respect to the turned-up portion 6 so as to form a flange section 7a. Flange sections 7b are similarly formed at the other end of each body.

Referring now again to FIG. 1, the flanges 3a, 3b formed by four flange sections 7a and four flange sections 7b leave not-connected portions at four corners. These portions are filled by corner pieces 8, each of which has two arms to be coupled with two adjacent flange sections.

Each flange section 7a, 7b is bent at its end at right angles to form an end portion 9. Each flange section 7a, 7b may be longer than the turned-up portion 6, as best seen in FIG. 3. The arms of each corner piece 8 are adapted to be clamped by bending inwardly the edge portion 9 of the flange section 7a, 7b of each side, as will be best understood in FIG. 1 in which numeral 10 designates an inwardly bent portion of the edge portion 9. The corner piece 8 is formed with an L-section portion 11 disposed at each corner and standing vertically to butt against the corner of the duct piece.

Bolts 5 for connecting together the flanges of the adjacent tubular bodies are adapted to pass through bolt holes 12 formed in the corner pieces 8 only. The flange sections 7a, 7b are adapted to be clamped together by means of elastic clips 13 of a shape similar to a FIG. 7 by virtue of their elasticity.

In the preferred embodiment, each tubular body is made by pressing a rectangular plate of a required width into a square tube, forming a cut at each corner, and bending each end of the tube to form the turned-up portions 6 and the flange sections 7a, 7b. In the alternative, it may be made by coupling four square plates together by use of flat lock seams to form a square tube.

When connecting the tubular bodies, their turned-up end 6 should be directed in the direction of flow through the duct.

From the foregoing, it will be understood that the present invention frees the workers from the troublesomeness which has so far accompanied the work of fastening the flanges of a duct of this type with bolts, because a joint of the duct 1 is formed simply by inserting the turned-up end of one body into the other end of the next body. Thus the two flanges 3a and 3b allow no transverse displacement and face each other so that the bolt holes in the corner pieces align with each other.

The present invention has another advantage that even if the packing 4 inserted between the flanges 3a and 3b is made of asbestos or glass fiber, fine particles therefrom are prevented from being drawn into the duct 1, because the inside edge of the packing 4 is covered up by the turned-up portions 6.

The present invention has still another advantage that the flanges 3a and 3b can be formed at low cost and yet have large mechanical strength, because they are integrally formed on the ends of each body unlike conventional flanges which are separately formed and welded to the body.

What is claimed is:

1. A duct piece for coupling together with other like duct pieces, said duct piece comprising a first and second end, a respective flange section at each said end for coupling together the duct pieces, said duct piece being of rectangular section, said first end having a turn-up portion said turned-up portion having at right angles thereto a first flange section, said first flange section having at a free end thereof and at right angles thereto a first terminal right angle end portion, said second end having at right angles thereto a second flange section, said second flange section having at a free end thereof and at right angles thereto a second terminal right angle end portion, said turned-up portion of said first end being a folded portion of double thickness of the material of the duct piece, said second end of said duct piece being a single thickness of the material of the duct piece, each said first and second flange section being longer than said turned-up-portion, and said first terminal right angle end portion being parallel to and extending away from said second terminal right angle end portion.

2. A duct comprising in combination:
   a plurality of duct pieces coupled together;
   a plurality of corner pieces attached to respective ones of said plurality of duct pieces, said plurality of corner pieces coupling together adjacent ones of said plurality of coupled together duct pieces;
   a plurality of packings disposed between adjacent ones of said coupled together duct pieces;
   a plurality of detachable elastic clips detachably coupling together adjacent ones of said coupled together duct pieces;
   each said duct piece having a first and second end, each said end having respective flange sections for coupling said duct pieces together, each said duct piece being of a rectangular section and having at said first end thereof a turned-up portion, said turned-up portion having at right angles thereto a first flange section, said second end of each said duct piece being a non-turned-up end and having at right angles thereto a second flange section;
   said plurality of elastic clips coupling together adjacent ones of said first and second flange sections of said coupled together duct pieces;
   said turned-up portion of said first end of one duct piece being received in said second non-turned-up end of an adjacent duct piece;
   one of said plurality of packings being disposed between the first flange section of one duct piece and the second flange section of an adjacent duct piece of said coupled together duct pieces; and
   said detachable elastic clips resiliently detachably attaching said first and second flange sections of adjacent duct pieces.

3. A duct as in claim 2, wherein said first flange sections of said turned-up portion of said first end of said duct pieces has a first terminal right angle end portion at a free edge of said first flange sections, and said second flange sections of said second non-turned-up end of said duct pieces has a second terminal right angle end portion at a free edge of said second flange sections.

4. A duct as in claim 3, wherein each of said elastic clips has means for engaging both said first and second terminal right angle end portions, and each of said elastic clips has means for engaging said first flange sections of said turned-up portion.

5. A duct as in claim 4, wherein each of said elastic clips is an inverted L-shape, said turned up-portion of said first end further comprises a folded portion of the material of said duct piece of double thickness, said second non-turned-up end of said duct piece is of single thickness of material, and each of said first and second flange sections is longer than said turned-up portion of said first end of said duct piece.

* * * * *